United States Patent [19]

Lapeyre

[11] Patent Number: 4,948,247

[45] Date of Patent: Aug. 14, 1990

[54] HIGH SPEED STROBOSCOPE SYSTEM FOR VISUALLY OBSERVING DYNAMIC PROPERTIES BY MOVING OBJECTS OF VARIOUS CHARACTERISTICS

[76] Inventor: James M. Lapeyre, P.O. Box 50699, New Orleans, La. 70150

[21] Appl. No.: 247,269

[22] Filed: Sep. 21, 1988

[51] Int. Cl.$^5$ .............................................. G01P 3/40
[52] U.S. Cl. ...................................... 356/23; 350/525
[58] Field of Search ................... 356/23; 350/523, 525

[56] References Cited

U.S. PATENT DOCUMENTS

| 1,311,186 | 7/1919 | Silverman | 350/525 |
| 4,258,297 | 3/1981 | Nakajima | 315/241 |
| 4,522,475 | 6/1985 | Ganson | 356/23 |
| 4,600,300 | 7/1986 | Rotello | 356/23 |
| 4,616,636 | 10/1986 | Nagashima et al. | 356/23 |

FOREIGN PATENT DOCUMENTS 2142738  1/1985  United Kingdom .................. 356/23

OTHER PUBLICATIONS

Marichev, V. A., "Stroboscope for Microstructural Examination of the Fatigue Process", [abstract only], *Industrial Lab*, vol. 35, No. 5 (May 1969), p. 750.

Andrews et al., "Light Emitting Diode as a Short-Duration Stroboscope", *Journal of Physics*, E, vol. 10, No. 6, (Jan. 1977), p. 95.

*Primary Examiner*—Richard A. Rosenberger
*Attorney, Agent, or Firm*—Laurence R. Brown

[57] ABSTRACT

An improved stroboscopic system permits higher response speeds in the order of nanoseconds and a richness of control fatures for highlighting different viewing surfaces including pulse flash length control in addition to frequency, color control, light emitting area control and light focussing features for concentration of available light on the viewing field. Thus, new applications such as the viewing the movement of selected portions of the surface of a high frequency piezoelectric responsive crystal structure are now possible. This is achieved by flashing at least one solid state light emitting element that produces light in an emitting area defined by the shape of a light emitting surface activated in response to externally derived synchronization pulses. Thus, when directed upon a field of view on a movable object and relating the synchronization pulses to the movement of the object within that viewing field, the illusion is produced that the moving object in at least a portion of the field of view receiving the emitted light from the solid state element is stationary to the human view, permitting detailed study of surface shapes and dynamic reactions in frequency ranges far above those viewable with prior art strobing methods. Provisions are made for positioning the light flash sources very close to the viewing surface without interference with a visible line of site. One embodiment provides microscopic viewing and photography of the strobed field of view.

21 Claims, 2 Drawing Sheets

HIGH SPEED STROBOSCOPE SYSTEM FOR VISUALLY OBSERVING DYNAMIC PROPERTIES BY MOVING OBJECTS OF VARIOUS CHARACTERISTICS

TECHNICAL FIELD

This invention relates to the observation of dynamic properties of moving objects under various lighting influences with strobocope systems, and more particularly it relates to the employment of phonon generated light, such as available in electronically actuated solid state LED light emitting elements, rather than the conventional gaseous plasma discharge used in prior art strobing systems, thereby to give higher speed response and more control over lighting conditions, such as light patterns, colors, pulse durations and direction.

BACKGROUND OF THE INVENTION

Conventionally gas plasma discharge of flash tubes in response to electronic trigger release of charges accumulated on capacitors have been used substantially universally in stroboscope systems as set forth for example by Nakajima in U.S. Pat. No. 4,258,297, Mar. 24, 1981. However, these systems are very limited in the top recurrence frequency of the strobing and could not be applicable to the investigation of high frequency recurring phenomena in a moving object, such as for example the visual study of the surface characteristics of a piezo electric body oscillating at very high frequency. Nor is it feasible with plasma discharges to vary light flash durations, colors and other lighting characteristics in order to highlight different kinds of viewing surfaces.

Also, it is known that ordinary light may be gated with electronic pulse controlled liquid crystal sheets by means of electronic control of light polarization in the crystal sheets to provide a viewing window through which ordinary light is directed as an alternative to plasma discharges in stroboscopic systems, as taught by Rotello in U.S. Pat. No. 4,600,300, Jul. 15, 1986. Such strobing is limited to a top strobing frequency of about 3.5 megaherz. Furthermore, the light contrast available on the moving object being observed with polarized crystals is subject to a high signal-to-noise ratio. Further limitations of this system include the inability to vary lighting conditions on the surface of moving objects being viewed to improve contrast or to highlight different kinds of surface texture, color of regions, etc.

The prior art has failed to provide an improved comprehensive and versatile strobe system of the nature provided hereinafter. The prior art is limited to lower frequency motion study and to very narrow restrictions on versatility of lighting conditions upon the movable object being viewed. Also it is not possible with conventional prior art systems to view moving objects microscopically or to photograph microscopic areas displaying dynamic motion characteristics.

It is therefore an object of this invention to provide an improved strobe system overcoming deficiencies in the prior art such as those hereinbefore set out.

One more specific objective of this invention is to push back the frontiers of the strobe system art to view recurring motion characteristics of higher frequency than heretofore feasible and to improve visibility of a variety of surface characteristics of a nature not feasible heretofore.

Another specific objective of the invention is to employ the versatile characteristics of phonon light emitting sources and solid state light emission phenomena, such as exhibited in LED light emitting elements, to the specific problems set forth in stroboscopic systems.

Still another objective of the invention is to provide stroboscopic systems capable of dynamic selection of light colors and light regions for viewing movable objects.

Further it is an objective of the invention to provide techniques of lighting a movable object for stroboscopic viewing consistent with very high frequency motion in the presence of very short light flash durations.

It is further an objective of the invention to provide systems and methods of microscopically viewing and photographing a moving body stroboscopically, particularly to enable observations such as microscopic changes of crystalline structure in response to such influences as electromagnetic fields of very high frequencies.

Other objects, and features of the invention will be found throughout the following description, claims and drawings.

SUMMARY OF THE INVENTION

This invention in providing improved, more versatile and higher speed strobing systems, departs from the conventional plasma gas discharge phenomena dependent upon charge and discharge cycles of a capacitor for timing, and employs high speed pulse responsive phonon light emission in solid state light emitting elements, typified by LED elements. The solid state light emitting devices respond to electronic activating pulses by lighting for a time duration controlled by the length of activating pulses for such short time periods as nanoseconds. Thus, the strobing speed is substantially increased over that conventionally available.

Electronic control circuits, under control of recurring synchronizing pulses related to a phase of movement of at least a portion of a moving object in the field of view upon which the emitted light pulses are flashed, then appear to the human view to be stationary so that the dynamic activity of the movement may be observed at much higher frequencies of cyclic movement than heretofore possible.

This invention provides numerous novel features not available in prior art plasma gas type strobe systems including higher strobing speeds readily operable above five megaherz, highlighting moving object surfaces with electronic selection of various light colors, choice in response to electronic controls of programmed regions on the moving object for the incidence of the strobing light flashes, positioning of the light emitting elements close to the moving object without interference with viewing to thereby intensify the available light from very short duration flashes, and microscopic viewing of dynamically active movable bodies. It is therefore possible by this invention to view and record such phenomena as the response of crystalline structure to electromagnetic fields, which may be of very high frequency.

In one embodiment a matrix array of small area LED cells is programmed to emit light independently for variable selection of different colored emitter cells, different regional patterns and for providing "see through" structure when positioning of the array interferes with a clear view of the moving object under study. Thus a flexibility of controls includes asynchronous or periodic triggering pulses for generating light flashes, variation of periodic frequency and flash duration or duty cycle within a periodic cycle, selection of light color and or regional pattern zones. If desired the LED cells may include optical lenses to focus or direct rays toward the moving object to be viewed. In this manner, microscopic views of a dynamically movable body may be observed and recorded, which would not be possible with conventional stroboscopic techniques, since the placement of a microscope viewer would interfere with the light path from the strobe light source to the object being viewed.

THE PREFERRED EMBODIMENTS OF THE INVENTION

Since this invention is critically dependent upon a new principle of operation in stroboscopic systems using novel programmed light sources departing from conventional gas plasma strobe flash systems, the light emitting elements are now discussed. It is known that the vibrational properties of some solid state materials, generally crystalline in structure, by way of phonon energy can emit light when excited by electronic pulses. A current commercially available product exhibiting this type of emission is the LED. The light emission in different solid state materials thus may be produced in different regions of the color spectrum, and thus emitting elements of various colors are obtainable. These elements thus are controlled to emit light in flashes of a duration corresponding to incident activating electronic pulse lengths. As distinguished from the transient and relatively uncontrollable light flashes in gas plasma therefore, control of the length of the light flashes is possible with solid state light emitting means. In particular, much shorter duration light flashes may be obtained, and thus these emitters will respond to activating pulses in the order of nanoseconds in duration, providing a medium for extending the strobe frequency far beyond that of plasma and easily above five megaherz periodic recurrence rates.

Figure 1:
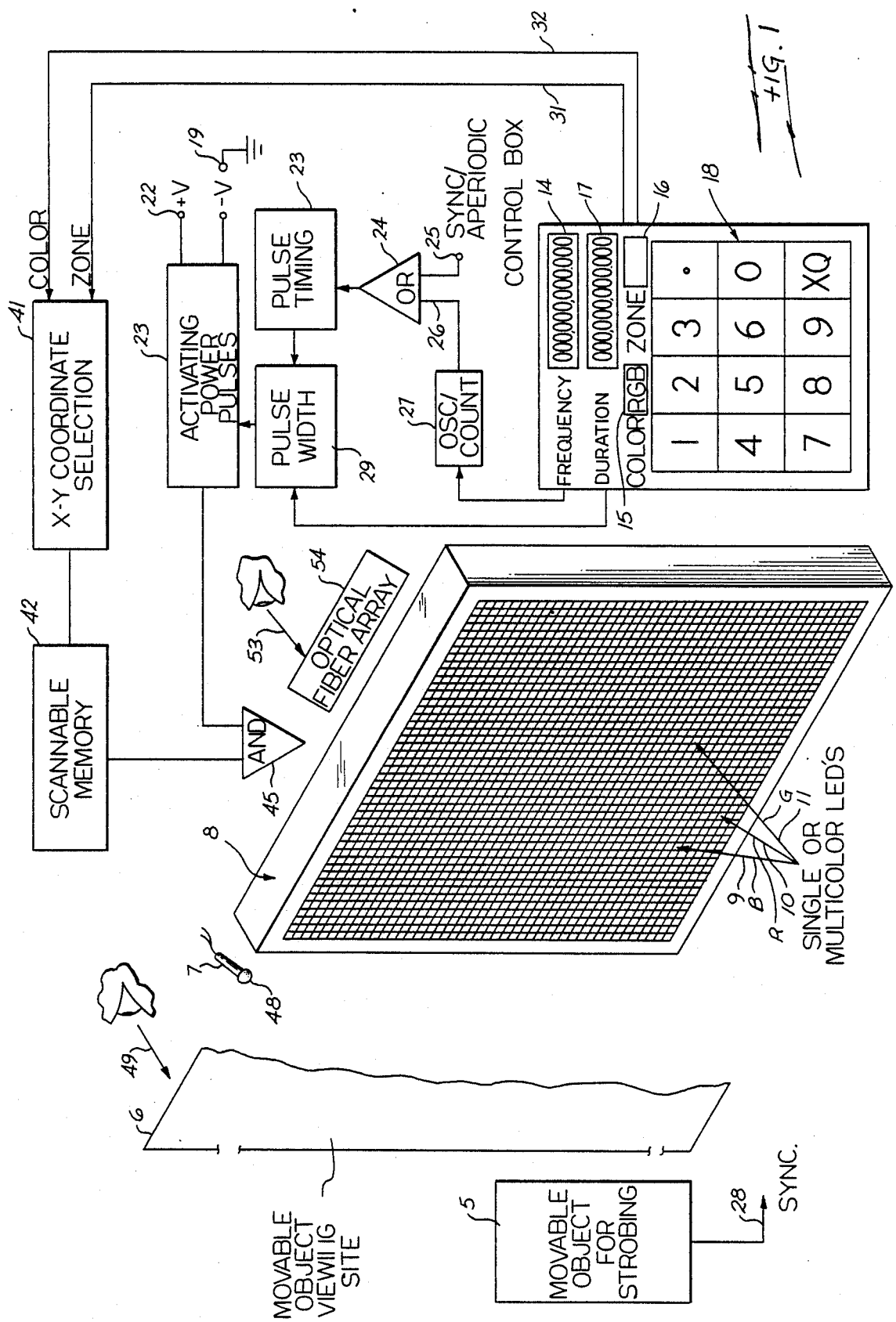
FIG. 1 shows a diagrammatic block diagram view of the improved strobosope system afforded by this invention.

The observation or study of dynamic activity of moving objects therefore with prior art gas plasma type of stroboscopic systems has been limited to mechanical type movement frequencies and could not heretofore be extended into electronic frequency ranges above about 3.5 megaherz with any known prior art strobing technique. Consider for example the impossibility of observing the dynamic surface deformation of a piezo electric crystal body in response to electronic excitations at high frequencies beyond those available heretofore. With such a task, it is also difficult to observe different crystalline surface textures with flashing light emission because of transparencies, reflections, absorptions and shadows. Thus, it has not been known how to provide heretofore a variable range of stroboscopic controls that could optimize viewing conditions for various surface characteristics. Accordingly, the preferred embodiment of the invention, as illustrated generally in FIG. 1, will advance the state of the art in strobing moving objects.

Thus, a movable object 5, may be viewed when located at a viewing site such as in plane 6 by flashing light energy onto a moving portion thereof, in order to provide the illusion to the human view that at least a portion of a moving object under view is stationary, thereby permitting observation and study of the dynamic characteristics of the moving body.

The flashing light energy provided by this invention is provided by phonon light emission in solid state light emitting bodies, generally typified by the single LED emitter element 7 or the matrix array of a plurality of such elements 8, to thereby give the aforesaid operating improvements and advantages over conventional strobe systems and methods, in general dependent upon plasma type gaseous discharge phenomena.

Thus, the high speed response of strobe systems is extended by several orders of magnitude over such prior art strobing techniques as gas plasma discharge and liquid crystal polarization techniques with control of photoflashes producible in the nanosecond pulse duration range. As in conventional systems, the selection of the repetitive frequency of the light flashes for observing moving objects is provided 14, but herein over a higher frequency range than feasible with the prior art systems above identified.

Note also that by employment of the matrix of light flash producing elements in the array 8, that many further advantages are provided by this invention, to be hereinafter discussed, such as for example variable color strobing. Thus, individual elements in the matrix 8 may be selected to emit yellow, blue, red or green light combinations, 9, 10, 11, for example. In accordance with well known color theory, a set of two or three of such colors may be programmed to produce different colors and combined they may produce "white" light. Thus, it may be seen that the matrix array 8 herein shown provides a medium for programming color selections in the strobing process. This, permits observation of crystalline surfaces that may be highlighted by light of a particular color, for example, in a manner that could not have heretofore been observed with prior art strobing systems. Thus this invention contemplates color selection controls 15, which will be discussed in more detail hereinafter.

Similarly the matrix array 8 of individual elements 7, which may take various physical configurations, permits selection of individual strobe lamp elements 7 in zone patterns, or the like, for regional or color reaction investigation of particular subdivisions of the viewed movable object at the viewing site 6 independently. This gives the additional functions of (1) isolating desired zones for observation and (2) superimposing different strobe light colors simultaneously in different observation regions, which functions were not heretofore possible in known prior art strobing systems. Accordingly this invention provides for selective control of specified regions or zones by means of appropriate manual zone selection means 16.

In prior art plazma discharge strobing systems, it has not been feasible to control the duration of emitted light pulses. The gaseous plasma discharge phenomena is inconsistent with any change of the duration of the emitted light by means of a variable length activation or firing pulse that initiates the light emission. However, with the phonon emission herein provided, the control over light emission duration is readily produced by an exciting pulse of predetermined length. Thus, the length of the light emission activating pulses, or the duty cycle of periodic activating pulses is controlled variably at the selection of the operator by corresponding controls 17. If high speed motion is being observed by a camera for recording, the control of the pulse duration may be critical in deriving good photographs.

Manual keyboard selections from the keyboard 18 may control a computer data processing system in accordance with known art, as for example that set forth in my U.S. Pat. No. 4,447,860, Oct. 15, 1985, taken with other strobing art such as that above identified. The following system operation is thus set forth in block diagram from (of the single line variety, ground connections 19 being assumed throughout). Each block thus may be custom designed by those skilled in the art for a simplified strobing system or may be a portion of a general purpose computer configuration programmed to perform functions later described.

For timing the occurrence of light emission activating pulses to be gated from a power source, typically the +V source shown at terminal 22, the activating power pulse supply block 23 is shown. Pulse timing is determined by input trigger or power gating pulses at pulse timing circuit 23. Either aperiodic or periodic timing is afforded by means of selection at OR circuit 24. Thus, for non-periodic types of motion trigger pulses at terminal 25 may be derived for example from the motion characteristics of the moving object being strobed as obtained at the output terminal 28 from a system 5 associated with the moving object to be viewed, or from other aperiodic pulse sources. Periodic strobing pulses may be provided by the oscillator-counter 27 under control of manual frequency selection at keyboard 18 to determine a periodic component of the motion of the object in the somewhat conventional manner set forth in U.S. Pat. No. 4,600,300 above identified, for example. The selection frequency is preferably digitally produced at the control panel display line 14.

Similarly the pulse duration is controlled by keyboard 18 and displayed at 17. In periodic signals this may be displayed in the form of duty cycle if desired. The pulse width control circuit 29 accordingly is triggered by the pulse timing circuit 23 to provide the programmed pulse width. There is of course a possible default control in the case of periodic timing related to a standard duty cycle somewhat less than half an oscillation period, if desired.

Whenever the matrix array of elements 8 is programmed for selection of desired elements, the color and zone control features may be employed, as shown from control lines 31, 32. A computer data processing system is readily controlled to select, store and scan individual coordinate positions in a conventional manner such as used in deriving stored data from a memory location. The x-y coordinate selection block 41 and scannable memory 42 represent this functional operation for programming selection from the keyboard 18. Thus, any one, or any subcombination of the light emitting elements in matrix array 8 may be selected for flashing in the AND circuit 45, such as the subcombination of red light emitting elements for color control. Stored subroutines in the computer may provided for selection of those elements in programmed patterns for emission in response to the power pulses for default or standard strobe color selections. This is done routinely in the same manner that characters are formed from matrix elements in many personal computer systems in the present state of the art. Such color selection may become critical in the microscopic viewing of crystalline structure, where light color may be used to highlight or make visible otherwise hard to detect crystalline formations, or where high frequency strobing of crystalline objects such as lasers which may produce or reflect colored light in response to periodic electromagnetic stimulation can be viewed in the presence of different colored strobing light sources.

A further advantage of this present invention is that the array 8 may be placed very close to the viewing site 6. This is important to provide maximum utility of the light produced from the light emitting elements. It is possible also to put a lens 48 on the elements for concentrating the light on a focal plane coincident with the viewing site, or to use other kinds of viewing lenses such as those of a microscope, which necessarily must be positioned so close to the viewing sight that it would interfere with the strobing light afforded by prior art strobe systems. If the line of sight 49 to the area of the moving object 5 at site 6 of interest is unimpeded, no particular precautions need be made to use the matrix array. However, the geometry or the close spacing of an array 8 to the site 6 may impede a direct view of the object 5 as indicated by viewing line 53. In such case an optical fibre array 54 may be interposed with individual fibres between light emitting elements in the matrix array 8 to afford a direct view of the movable object at the viewing site through the array 8 of the movable object 5.

Figures 2, 3, 4:
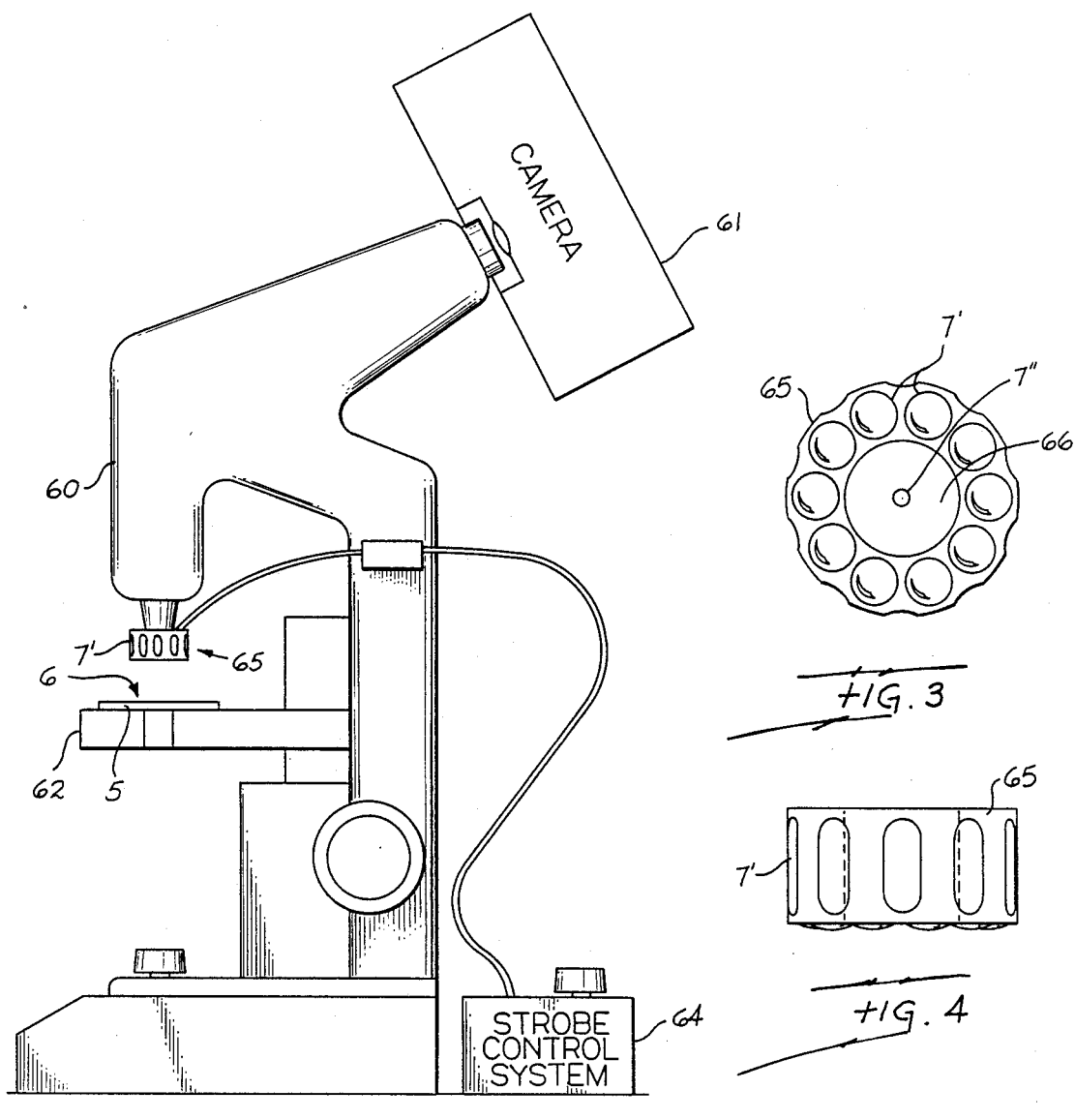
FIG. 2 shows a side view sketch of a microscopic stroboscopic viewer embodiment of the invention.
FIGS. 3 and 4 show in more detail the relationship of LED stroboscopic lamp structure provided in accordance with this invention for operation in the presence of viewing lenses for observing a dynamically viewable surface.

A further embodiment of viewing means and strobing lamp structure afforded in a microscopic stroboscope system afforded by this invention is set forth in FIG. 2. Thus the microscope 60, upon which a viewing camera 61 may be mounted for photographing the stroboscopically developed structure, has a viewing table 62 upon which the movable object 5 may present a viewing site 6 for microscopic inspection. The strobe lamps 7', hereinbefore described, are arranged in a ring assembly 65 fitted about the microscope lens 66, better seen from the views of FIGS. 3 and 4. The LEDs 7' may have lenses which focus the strobing light onto the field of view of the microscope at viewing surface 6 in the manner before described. Alternatively a very small diameter LED 7" could be located axially in the microscope lens 66 for strobing purposes, and thus could be carried extremely close to the surface 6 under observation to produce maximum light and optimum microscopic viewing of the movable surface detail. In any event, the light flashes for strobing are derived from strobe flash source 65 which coacts with the viewing lens 66 of the microscope and moves therewith to assure that the field of view of the microscope is strobed with a light level sufficient to view the movements of the body with microscope 60, and to take photographs with the camera 61. The strobe control system 64 is of the type hereinbefore described in connection with the FIG. 1 embodiment.

It is therefore evident that the state of the strobing art is improved by this invention to produce a novel system and novel strobing methods which extend the functional performance of strobing systems beyond that possible with prior art systems and methods. Therefore, those novel features and steps characteristic of the spirit and scope of this invention are set forth with particularity in the following claims.

I claim:

1. An improved stroboscope system comprising in combination,
   solid state light emitting means responsive to emit light over discrete time durations defined by the presence of input activating pulses of a predetermined duration,
   strobing control means providing said input activating pulses to said light emitting means timed to occur in response to synchronizing signals to produce light flashes having a duration substantially that of the activating pulses,
   means for directing said light flashes onto a movable object with a light intensity permitting an observer to view a moving part of the object in a movable phase thereof related to the synchronization pulses as if stationary comprising a patterned array of individual light emitting elements and means for processing said activating pulses to predetermined ones of the elements in said array, and
   control means for separately programming different subsets of the individual elements to emit light in response to said input activating pulses in different respective patterns on said movable object.

2. The stroboscope system of claim 1 wherein different light emitting elements in said array emit light of different colors and including means for superimposing different strobe light colors simultaneously in different observation regions of said movable object.

3. The stroboscope system of claim 1 further comprising means operable with said strobing control means to flash individual light emitting elements for emitting light of one predetermined color over selected patterned regions on the movable object.

4. The stroboscope system of claim 1 wherein said light emitting elements include optical lens means for focussing emitted light from a plurality of light emitting elements in said array onto a predetermined viewing site disposed adjacent said array.

5. The system of claim 1, wherein the light emitting elements are LEDs and further comprising a viewing site for placement of the moving object with the array of LEDs positioned closely to the viewing site to produce a substantial portion of the light energy emitted thereby at the moving object.

6. The system of claim 5 further comprising means interspersing the pattern of LEDs in said array with transparent regions permitting a direct view of the moving object when being strobed.

7. The system of claim 1 further comprising viewing means interspersed in said array with said individual light emitting elements for visually observing the movable object when lighted by said light flashes.

8. The system of claim 1 wherein individual elements for emitting light of different colors are patterned in said array to produce strobing by flashes of different colors and further comprising control means for programming light flashes of the individual elements of particular colors to control the light color produced for strobing said movable object.

9. The system of claim 1 further comprising aperiodic strobing control means for producing said synchronizing signals repetitively from the movable object to provide a continuing repetitive view of movement in the movable object.

10. The system of claim 1 further comprising periodic strobing control means operable to produce said light flashes at frequencies above five million herz.

11. The system of claim 1 further comprising variable control means for operating said solid state light emitting means at a selected variable frequency of pulse repetition rate over a range of light flash pulse durations.

12. The system of claim 1 further comprising a microscope for viewing a movable object position lighted by the light flashes from said array arranged at a position circumferentially adjacent to a viewing lens of the microscope.

13. The system of claim 12 further comprising means positioning said light emitting means array adjacent said movable object to move together with a microscope viewing lens for lighting the field of view of the microscope with said light flashes.

14. The method of stroboscopically viewing a movable object as defined in claim 1 further comprising the steps of:
    positioning the movable object with a portion thereof in the field of view of a microscope, and
    lighting said object portion with strobe light flashes from said emitting means array disposed to move together with a viewing lens of the microscope.

15. An improved stroboscopic system as defined in claim 1 having means for producing on a moving object in response to a sequence of recurring actuation pulses flashes of different predetermined light colors emitted from a subset of the plurality of the light emitters in said array to eliminate the moving object with a flash pattern established by said subset and timed in relationship to movements of the object to produce the illusion that at least a portion of the moving object is stationary to the human view and means for selecting flashes from different subsets of light emitters to produce different desired colors and emitters of illumination.

16. The method of strobing a moving object to view it as if stationary in a recurring phase of movement thereof comprising the steps of: repetitively exciting a selected subset of a plurality of electronically actuated solid state light emitting elements positioned in a patterned array of such elements to produce a sequence of light flashes in a patterned emitting area thereby defined for lighting by the solid state characteristics of the light emitting elements and activated at synchronized times determined by a sequence of synchronization pulses derived as a function of movement of said moving object, directing the emitted light from said light emitting array upon a field of view on a movable object, and relating the synchronization pulses to the recurring phases of movement of the object within that field of view to produce the illusion that the moving object in a portion of the field of view receiving the pattern of emitted light from said selected subset of elements is stationary to the human view.

17. An improved stroboscopic system having means for producing on a predetermined region of a moving surface area presented by a moving object in response to selective control of recurring light flashes produced at a subset plurality of spaced light emitting positions defining said region selected from an array defining a set of said positions and timed to produce in said region of the surface area the illusion to the human view that the regional portion of the moving object surface area lighted by the flashes is stationary.

18. The improved strobing method of viewing a selected pattern portion of a moving surface area of variable shape for dynamic motion analysis by providing a recurring light flash pattern produced by selective flashing of patterned subsets of an array of LED light emitting elements directed to illuminate said selected pattern portion at repetitive times synchronized with movements on said surface area for producing the illusion that motion of the surface area in the selected pattern portion is stationary.

19. An improved stroboscopic system having means for positioning light emitting means for producing recurring strobe light flashes over an emission surface area positioned in close proximity to a moving surface to illuminate a field of view thereon wherein the light emitting means region resides in a position interfering with a direct view of the illuminated field of view on the moving surface, and means apportioning the emission surface area into light producing regions interspersed by transparent regions permitting a direct view of the moving surface while being strobed.

20. The improved stroboscopic method of electronically selecting from a patterned array of light producing elemental areas different subsets of elemental areas to produce recurring flashes of light directed onto a moving object to form different lighted patterns at a timing related to the movement of the object for providing the illusion to the human view that at least a portion of the moving object presented for human viewing by said lighted pattern is stationary.

21. An improved electronic strobing system, comprising in combination, a matrix array of light producing elemental areas for directing light flashes from the elemental areas upon a moving object for stroboscopic examination, and selective control means for producing light flashes from various subcombinations of the elemental areas as different lighted patterns on the moving object timed to make at least a portion of the moving object visible to the human view within the lighted pattern to appear stationary.

* * * * *